(12) United States Patent
Edgar

(10) Patent No.: US 6,503,002 B1
(45) Date of Patent: Jan. 7, 2003

(54) METHOD AND APPARATUS FOR REDUCING NOISE IN ELECTRONIC FILM DEVELOPMENT

(75) Inventor: Albert D. Edgar, Austin, TX (US)

(73) Assignee: Applied Science Fiction, Inc., Austin, TX (US)

( * ) Notice: Subject to any disclaimer, the term of this patent is extended or adjusted under 35 U.S.C. 154(b) by 0 days.

(21) Appl. No.: 09/487,967

(22) Filed: Jan. 18, 2000

Related U.S. Application Data

(63) Continuation of application No. 08/979,038, filed on Nov. 26, 1997, now Pat. No. 6,069,714.
(60) Provisional application No. 60/032,114, filed on Dec. 5, 1996.

(51) Int. Cl.[7] .......................... H04N 1/04; G03D 11/00
(52) U.S. Cl. ...................... 396/564; 396/604; 358/487; 430/21
(58) Field of Search ................... 396/639, 604, 396/564; 355/27–29, 77, 40, 41; 358/487, 471, 500, 505, 474; 430/21

(56) References Cited

U.S. PATENT DOCUMENTS

| | | | |
|---|---|---|---|
| 2,404,138 A | 10/1946 | Mayer ........................ 95/94 |
| 3,520,689 A | 7/1970 | Nagae et al. ................. 96/55 |
| 3,520,690 A | 7/1970 | Nagae et al. ................. 96/55 |
| 3,587,435 A | 6/1971 | Chioffe ....................... 95/89 |
| 3,615,479 A | 10/1971 | Kohler et al. ................. 96/48 |
| 3,615,498 A | 10/1971 | Aral ............................ 96/55 |
| 3,617,282 A | 11/1971 | Bard ............................ 96/59 |
| 3,747,120 A | 7/1973 | Stemme ...................... 346/75 |
| 3,833,161 A | 9/1974 | Krumbein .................... 226/92 |
| 3,903,541 A | 9/1975 | Von Meister et al. ....... 354/317 |
| 3,946,398 A | 3/1976 | Kyser et al. .................. 346/1 |
| 3,959,048 A | 5/1976 | Stanfield et al. ............ 156/94 |
| 4,026,756 A | 5/1977 | Stanfield et al. ........... 156/554 |
| 4,081,577 A | 3/1978 | Horner ....................... 427/424 |
| 4,142,107 A | 2/1979 | Hatzakis et al. ............ 250/571 |
| 4,215,927 A | 8/1980 | Grant et al. ................ 354/317 |
| 4,249,985 A | 2/1981 | Stanfield .................... 156/554 |
| 4,265,545 A | 5/1981 | Slaker ........................ 356/431 |
| 4,301,469 A | 11/1981 | Modeen et al. .............. 358/75 |
| 4,490,729 A | 12/1984 | Clark et al. .................. 346/75 |
| 4,501,480 A | 2/1985 | Matsui et al. ............... 354/298 |
| 4,564,280 A | 1/1986 | Fukuda ...................... 354/317 |
| 4,594,598 A | 6/1986 | Iwagami ..................... 346/140 |
| 4,621,037 A | 11/1986 | Kanda et al. ................. 430/30 |

(List continued on next page.)

FOREIGN PATENT DOCUMENTS

| | | | |
|---|---|---|---|
| EP | 261 782 A2 | 8/1987 | ............ H04N/1/46 |
| EP | 0 482 790 B1 | 9/1991 | ............ H04N/1/40 |
| EP | 0 525 886 A3 | 7/1992 | ............ G03D/5/00 |

(List continued on next page.)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546–550, 1994.

(List continued on next page.)

Primary Examiner—D Rutledge
(74) Attorney, Agent, or Firm—Dinsmore & Shohl LLP

(57) ABSTRACT

In electronic film development, a film is scanned, using light, multiple times during development. The light is reflected from an emulsion containing milky undeveloped silver halide embedded with developing grains. The undeveloped halide layer has a finite depth over which photons from a light source scatter backward. This depth is within the range of the coherency length of infrared sources commonly used in electronic film development, causing coherency speckle noise in the scanned image. A prescan made after the emulsion swells, but before the silver grains develop, normalizes subsequent scans, pixel by pixel, to cancel coherency speckle and other defects.

17 Claims, 3 Drawing Sheets

U.S. PATENT DOCUMENTS

| | | | |
|---|---|---|---|
| 4,623,236 A | 11/1986 | Stella | 354/318 |
| 4,633,300 A | 12/1986 | Sakai | 358/41 |
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,736,221 A | 4/1988 | Shidara | 354/317 |
| 4,741,621 A | 5/1988 | Taft et al. | 356/376 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,957,900 A | 9/1990 | Yamazaki | 505/1 |
| 4,969,045 A | 11/1990 | Haruki et al. | 358/228 |
| 4,994,918 A | 2/1991 | Lingemann | 358/214 |
| 5,027,146 A | 6/1991 | Manico et al. | 354/299 |
| 5,034,767 A | 7/1991 | Netz et al. | 354/317 |
| 5,079,222 A | 1/1992 | Yamazaki | 505/1 |
| 5,091,972 A | 2/1992 | Kwon et al. | 382/54 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blaxkman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,371,542 A | 12/1994 | Pauli et al. | 348/262 |
| 5,391,443 A | 2/1995 | Simmons et et | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,436,738 A | 7/1995 | Manico | 358/503 |
| 5,440,365 A | 8/1995 | Gates et al. | 354/293 |
| 5,447,811 A | 9/1995 | Buhr et al. | 430/20 |
| 5,448,380 A | 9/1995 | Park | 358/520 |
| 5,452,018 A | 9/1995 | Capitant et a | 348/651 |
| 5,465,155 A | 11/1995 | Edgar | 358/500 |
| 5,477,345 A | 12/1995 | Tse | 358/500 |
| 5,496,669 A | 3/1996 | Pforr et al. | 430/22 |
| 5,516,608 A | 5/1996 | Hobbs et al. | 430/30 |
| 5,519,510 A | 5/1996 | Edgar | 358/471 |
| 5,546,477 A | 8/1996 | Knowles et al. | 382/242 |
| 5,550,566 A | 8/1996 | Hodgsone et al. | 345/202 |
| 5,552,904 A | 9/1996 | Ryoo et ert | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A | 12/1996 | Petruchik | 396/315 |
| 5,596,415 A | 1/1997 | Cosgrove et al. | 358/296 |
| 5,627,016 A | 5/1997 | Manico | 430/434 |
| 5,641,596 A | 6/1997 | Gray et al. | 430/21 |
| 5,649,260 A | 7/1997 | Wheeler et al. | 396/56 A |
| 5,664,253 A | 9/1997 | Meyers | 396/603 |
| 5,664,255 A | 9/1997 | Meyers | 396/603 |
| 5,667,944 A | 9/1997 | Reen et all. | 430/359 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,771,107 A | 6/1998 | Flujimoto et al. | 358/464 |
| 5,790,277 A | 8/1998 | Edgar | 358/487 |
| 5,835,795 A | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,959,720 A | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Mixawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,065,827 A | 5/2000 | Bullock et al. | 347/19 |
| 6,069,714 A | 5/2000 | Edgar | 358/487 |
| 6,088,084 A | 7/2000 | Nishio | 355/75 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,200,738 B1 | 3/2001 | Takano et al. | 430/362 |

FOREIGN PATENT DOCUMENTS

| | | | |
|---|---|---|---|
| EP | 0 580 293 A1 | 1/1994 | H04N/1/01 |
| EP | 0 601 364 A1 | 6/1994 | H04N/1/387 |
| EP | 0 669 753 A2 | 2/1995 | H04N/1/407 |
| EP | 0 794 454 A2 | 2/1997 | G03N/27/73 |
| EP | 0 768 571 A2 | 4/1997 | G03D/13/00 |
| EP | 0 806 861 A1 | 11/1997 | H04N/1/00 |
| EP | 0 878 777 A2 | 11/1998 | G06T/5/40 |
| EP | 0 930 498 A2 | 12/1998 | G01N/21/88 |
| TW | 350183 A * | 1/1999 | |
| WO | WO 90/01240 | 2/1990 | H04N/1/40 |
| WO | WO 91/09493 | 6/1991 | H04N/5/217 |
| WO | WO 97/25652 | 7/1997 | G03D/5/00 |
| WO | WO 98/19216 | 5/1998 | G03C/5/29 |
| WO | WO 98/25399 | 6/1998 | H04N/1/38 |
| WO | WO 98/31142 | 7/1998 | H04N/5/253 |
| WO | WO 98/34157 | 8/1998 | |
| WO | WO 98/34397 | 8/1998 | |
| WO | WO 99/43148 | 8/1999 | H04N/1/00 |
| WO | WO 99/43149 | 8/1999 | H04N/1/100 |
| WO | WO 01/01197 | 1/2001 | G03D/5/00 |
| WO | WO 01/13174 A1 | 2/2001 | G03D/5/06 |
| WO | WO 01/45042 A1 | 6/2001 | G06T/5/00 |
| WO | WO 01/50192 A1 | 7/2001 | G03C/7/407 |
| WO | WO 01/50193 A1 | 7/2001 | G03C/7/407 |
| WO | WO 01/50194 A1 | 7/2001 | G03C/7/407 |
| WO | WO 01/50196 A1 | 7/2001 | G03C/7/407 |
| WO | WO 01/50197 A1 | 7/2001 | G03C/7/42 |
| WO | WO 01/52556 A2 | 7/2001 | H04N/9/11 |

OTHER PUBLICATIONS

"Anisotropic Spectral Magnitude Estimation Filters for Noise Reduction and Image Enhancement", Aich, T., et al., Philips GmbH Research Laboratories, IEEE, pp. 335–338, 1996.

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", Stimpson, D., et al., Research Reports, BioTechniques, vol. 25, No. 5, pp. 886–890, 1998.

"Low–Cost Display Assembly and Interconnect Using InkJet Printing Technology", Hayes, D. et al., Display Works '99, MicroFab Technologies, Inc., pp. 1–4, 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Protorealistic Ink–Jet Printing Through Dynamic Spot Size Control", Wallace, D., Journal of Imaging Science and Technology, vol. 40, No. 5, pp. 390–395, Sep./Oct. 1996.

"MicroJet Printing of Solder and Polymers for Multi–Chip Modules and Chip–Scale Package", Hayes, D., et al., Micro-Fab Technologies, Inc.

"A Method of Characterisstics Model of a Drop–on–Demand Ink–Jet Device Using an Integral Method Drop Formation Model", Wallace, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

METHOD AND APPARATUS FOR REDUCING NOISE IN ELECTRONIC FILM DEVELOPMENT

RELATED APPLICATION

This application is a continuation application of Ser. No. 08/979,038 filed Nov. 26, 1997, U.S. Pat. No. 6,069,714 which claims the benefit of U.S. Provisional Application No. 60/032,114, filed Dec. 5, 1996.

FIELD OF THE INVENTION

This invention generally relates to the electronic development of film and more particularly to a method and apparatus for reducing noise in electronic film development.

BACKGROUND OF THE INVENTION

Electronic film development, also known as digital development, is a method of digitizing color film during the development process as disclosed in U.S. Pat. No. 5,519,510 issued to the present inventor. Conversion of analog images into digital data, or scanning, has become widespread for a variety of uses, including storing, manipulating, transmitting, displaying or printing copies of the images.

In order to convert a photographic image into a digital image, the film image frame is transported through a film scanning station, and illuminated along each scan line with a linear light beam of uniform, diffuse illumination, typically produced by a light integrating cavity or integrator. The light transmitted through the illuminated scan line of the image frame is focused by a lens system on a CCD-array image detector which typically produces three primary color light intensity signals for each image pixel. These light intensity signals are then digitized and stored. Film scanners which enable the electronic development of film have a variety of forms today and the common aspects of film image frame digitizing, particularly line illumination and linear CCD array based digitizers, are described in greater detail in U.S. Pat. No. 5,155,596.

In electronic film development, the developing film is scanned at a certain time interval(s) using infrared light so as not to fog the developing film, and also to increase penetration of the light through any antihalation layers. Some of the incident light is reflected from an emulsion on the film which contains milky, undeveloped silver halide. The undeveloped halide emulsion has a finite depth over which the photons from the light source will scatter and reflect back toward a detector. This depth is within the range of the coherency length of infrared light sources commonly in use in electronic film development today. It is this finite reflective depth which causes noise in the scanned image due to coherency speckle. Noise in the scanned image results in capturing an image distorted by graininess.

Because of the longer wavelength of infrared light, both the wavelength and the dividing fractional bandwidth for a fixed bandwidth contributes to a longer coherency length than normally encountered in visible light. In addition, the width of the milky silver halide layers is very thin in electronic film development, reducing the coherency length necessary to produce interference speckle.

Furthermore, the image seen through the back side of the film is very faint, so any coherency speckle is amplified as the faint image is amplified and the image is distorted. This problem is apparent in scans of the film regardless of whether light is reflected from the top or bottom of the film, or is transmitted through the film. However, it is predominant in the rear reflection scan due to the increased light reflected by the antihalation layer. No prior art methods appear to address this significant problem. Generally, during film processing, the dry emulsion layer over the film substrate is subjected to an aqueous bath which causes the emulsion to expand. During electronic film processing, photons penetrating the emulsion strike particles suspended in the emulsion and reemerge to be registered by light sensors. As the emulsion expands, the distance between the photon reflecting particles varies proportionally. If the resulting difference between the photons' exit paths is a quarter wavelength difference, then a speckle point can change from black to white or from white to black. Thus, any attempt to remove the speckle effect by differencing images made while the emulsion is in a first expanded position and a subsequent second expanded position can actually make the speckle effect worse by overlaying two different speckle patterns. For these reasons, coherency speckle is a significant problem in practicing electronic film development.

To view coherent speckle with the human eye, the path length traveled by the light can be no more than the coherency length of the light source. Beyond the coherency length, the speckle shimmers at the speed of light and appears to the viewer to be continuous. The characteristic grainy, or speckled, appearance of laser light, which is a coherent light source, is due to interference effects which result from coherence. Under laser light, everything in a room appears speckled, and the speckles appear to shimmer as the light, object, or viewer move.

Even under ordinary light, speckle is sometimes seen when there are very short path differences and very narrow light angles involved, as for example when viewing a white sheet of paper in direct sunlight. For noncoherent light, the coherency length is on the order of the wavelength divided by the percent bandwidth. Because this usually amounts only to a few wavelengths of light, coherency shimmer is not normally visible in real world viewing where noncoherent light is the norm.

It is, therefore, an object of this invention to provide a method of electronic film development which significantly reduces noise in capturing a developed or developing image.

It is another object of this invention to provide a method of electronic film development which significantly reduces or entirely eliminates coherent speckle in a developed image.

It is yet another object of the present invention to eliminate noise caused by coherent speckle during electronic film development which is altered by emulsion expansion.

To achieve these and other objects which will become readily apparent upon reading the attached disclosure and appended claims, an improved method of electronic film development which significantly reduces the amount of coherent speckle noise in an image is provided. Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

According to the present invention, the foregoing and other objects and advantages are attained by an electronic film development method and apparatus by which coherency speckle and other defects are reduced to render commercially viable images. The method and apparatus for reducing noise in electronic film development of a substrate bearing a latent image includes applying a chemical solution to a film substrate to expand the substrate a predetermined amount; allowing the substrate to substantially expand to the predetermined amount; scanning the substrate to generate a first scan of the substrate image; inducing development of the substrate; scanning the substrate after development to generate a second scan; and generating an image with reduced noise from the first and second scan information.

DETAILED DESCRIPTION OF THE INVENTION

Figure 1:
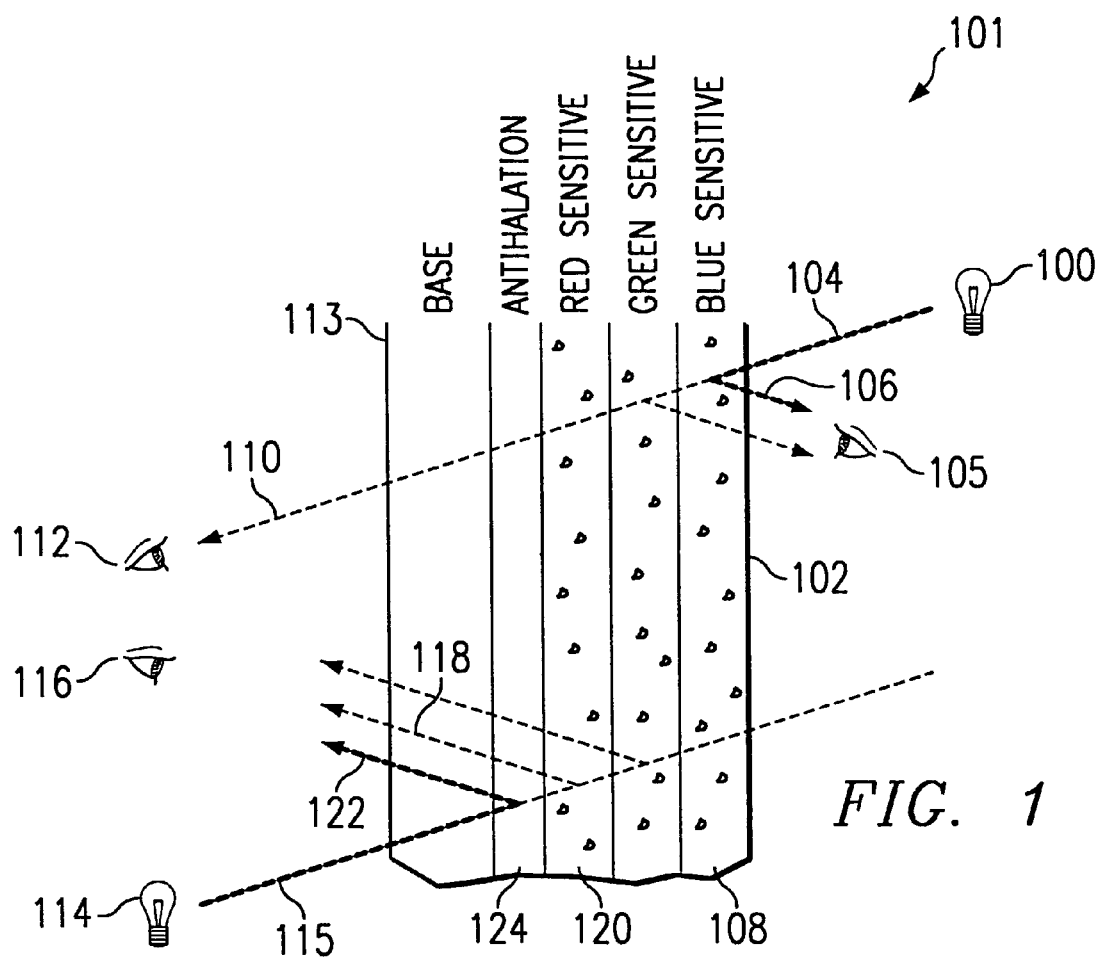
FIG. 1 is a cross-sectional view of a film layer structure being exposed to light in which the method of this invention can be applied.

The invention will now be described in more detail with reference to the various related figures. In the figures, the invention is presented in connection with conventional color film having at least three different layers. FIG. 1 is a representation of how each of three layers of a film 101, sensitive to red, green and blue respectively, are viewed when exposed to light. When the developing film is viewed from the top during development, the top layer is seen clearly while the lower layers are substantially occluded by the opacity of the top layer. Viewed from the rear during development, the back layer is seen while the other layers are mostly occluded. Finally, when viewed by light transmitted through the film, the fraction of light that does penetrate all three layers is modulated by all three layers, and so contains a view of all three layers. More specifically, as a light source 100 at the front 102 of the film 101 transmits light 104 through the various layers of the film 101, a viewer 105 from the front 102 of the film 101 primarily sees light 106 reflected from the blue sensitive layer 108 with some of the light 110 transmitting through all of the layers to be ultimately viewed by viewer 112 from the back 113 of the film 101. When a light source 114 at the back 113 of the film 101 transmits light 115 through the layers, the viewer 116 sees light 118 reflected from primarily the red sensitive layer 120. The viewer 116 also detects a reflection 122 from the antihalation layer 124 which includes coherency speckle. This coherency speckle becomes image-related noise which the present invention reduces. Because of the additional light 122 reflected by the antihalation layer 124, coherency speckle is worse for the rear reflection image; however, coherency speckle also contaminates the front reflection and transmitted images. Thus, its elimination will improve all three images seen by viewers 105, 112, and 116.

Figure 2:
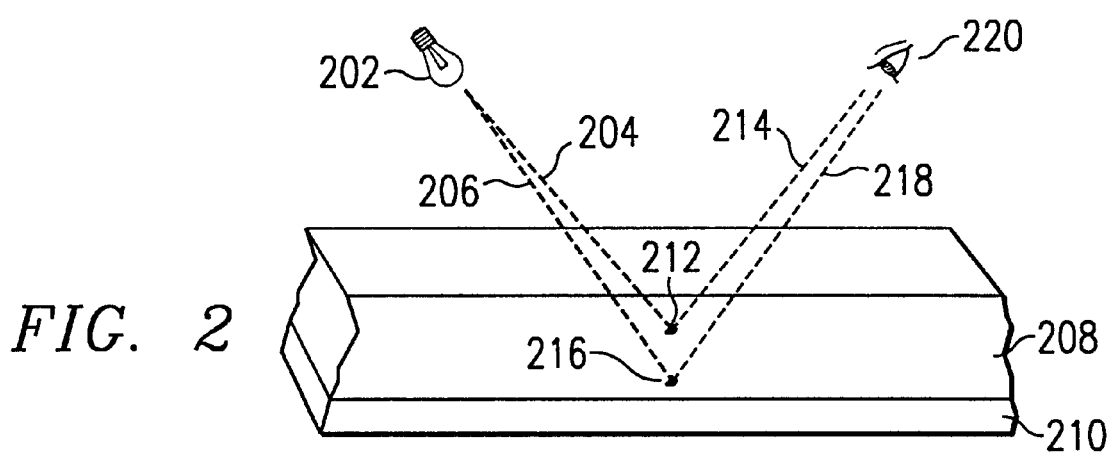
FIG. 2 is a cross-sectional view illustrating coherency speckle in a film layer structure.

FIG. 2 illustrates the phenomenon of coherency speckle in more detail in the context of the present invention. A typical light source 202 emits two photons along paths 204 and 206. These photons penetrate into a milky diffuser 208, such as a silver halide emulsion, deposited on a substrate 210. Depending on the degree of opacity, photons will penetrate a random distance into the diffuser 208 before they hit a particle and are reflected back. The photon of light traveling along path 204 is shown striking particle 212 and reemerging along path 214. The photon along path 206 strikes particle 216 and reemerges along path 218. In the illustrated case, both paths 214 and 218 reconverge on a viewer 220.

When the light source 202 is a source of coherent light such as a laser, the photons emitted along paths 204 and 206 are coherent in that they are in phase with one another along the wavefront of the light. Assuming that the two particles 212 and 216 are so close together so as to appear overlapping at a single point when detected by viewer 220, the two photons may interfere with each other at the viewer 220, like ocean waves merging from different angles. In particular, if the total length of the two traversal paths 204–214 and 206–218 differ from each other by an integer multiple of the wavelength of the coherent light emitted by source 202, then the photons will constructively interfere with each other at viewer 220. Thus, their electric vectors will add to produce twice the electric field, and four times the power. If, on the other hand, the path lengths differ by an integer multiple and a half of the light source wavelength, the two photons will interfere destructively, meaning the electric vectors will cancel and produce no light at the viewer 220. The effect of this phenomenon over a film surface area which is large relative to the light source wavelength is that on average two coherent photons will produce twice the average power of a single photon. However, the point detected by viewer 220 corresponding to the image particles 212 and 216 may either appear very bright or completely black depending on the degree of interference in the reflected light. This effect is known as coherent speckle and it introduces noise in current methods of electronic film development.

Figure 3A:
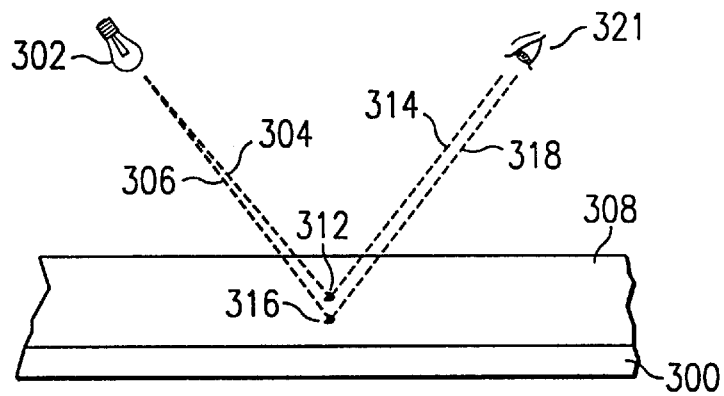
FIG. 3A is a cross-sectional view of a film layer undergoing electronic film development before emulsion expansion.
Figure 3B:
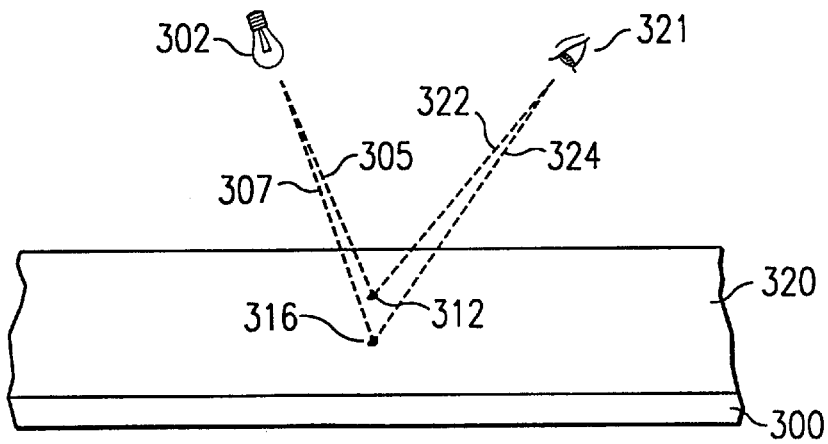
FIG. 3B is a cross-sectional view of a film layer undergoing electronic film development after emulsion expansion.

Reference is now made to FIGS. 3A and 3B for a description of a related speckle problem unique to electronic film development. During film processing in general, the dry emulsion layer 308 over the film 300 is subjected to an aqueous bath which causes the emulsion 308 to expand. Referring now to FIG. 3A, a light source 302 emits two photons along paths 304 and 306. The photons penetrate into the dry emulsion 308. The photon traveling along path 304 is seen striking particle 312 located within the emulsion 308 and reemerging along path 314. Similarly, the photon along path 306 strikes particle 316 in the emulsion 308 and reemerges along path 318. In the illustrated case, both paths 314 and 318 reconverge on a viewer 321. FIG. 3B represents the expanded emulsion 320 after it has been subjected to an aqueous bath. As in FIG. 3A, a light source 302 emits two photons along paths 305 and 307. The photons penetrate the expanded emulsion 320. The photon along path 305 is seen to strike particle 312 and reemerge along path 322, and the photon along path 307 strikes particle 316 and reemerges along path 324. Both paths 322 and 324 reconverge on a viewer 321. Because of the expansion of the emulsion 320, the distance between the photon reflecting particles 312 and 316 has also expanded proportional to the expansion of the emulsion 320. This causes the difference in path length between total path 304–314 of the first proton and the total path 306–318 traveled by the second proton within emulsion 308 to increase to the greater difference between paths 304–322 and 306–324 in the expanded emulsion 320. If the difference in distance between the particles 312 and 316 is only a quarter wavelength (less than one four-thousandths of a millimeter in a typical application using infrared light), then a speckle point can completely change from black to white, or from white to black. Thus, any attempt to remove the speckle effect by differencing an image made with the pre-expanded emulsion 308 from the image made with the expanded emulsion 320 can actually make the speckle effect worse by overlaying two different speckle patterns.

The present invention reduces the amount of coherency speckle detected by electronic film development by scanning a substrate bearing a latent image after the emulsion has expanded to its final thickness but before development has begun, and differencing that scan from the resultant post-development scan.

Figure 4:
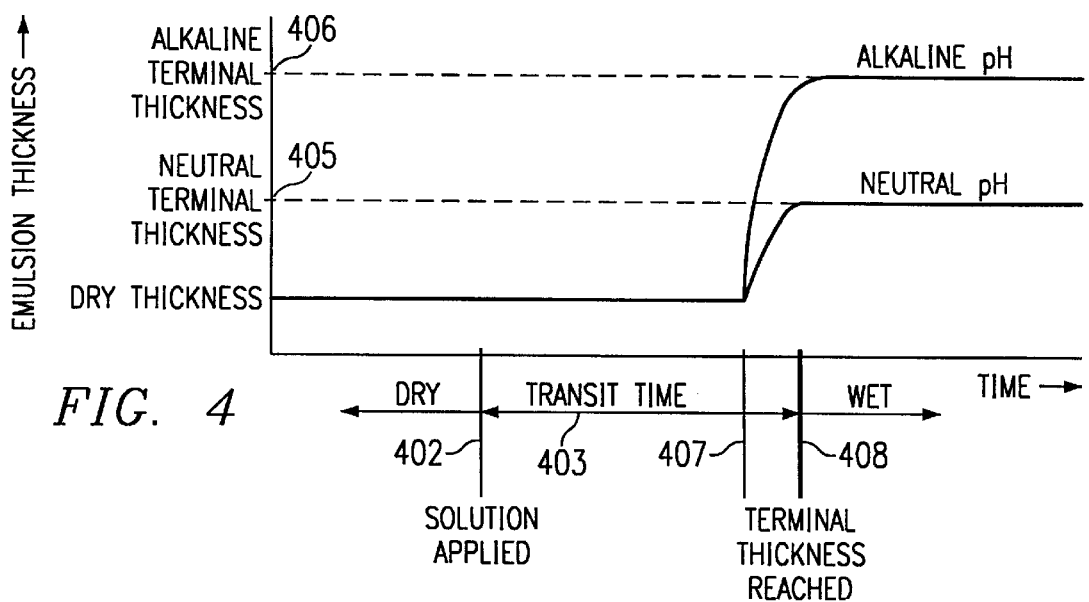
FIG. 4 is a graph showing the relationship of emulsion expansion over time upon application of a neutral and alkaline solution.

First, a solution is applied to the emulsion to initiate its full expansion. FIG. 4 depicts the emulsion thickness which may contribute to the speckle effect, and the relationship between application of both a non-alkaline pH solution (for example, a neutral solution with a pH factor of 7.0 or less, e.g., that of water) and an alkaline pH solution (pH above 7.0) to emulsion and emulsion thickness. Upon application of a neutral pH solution at time 402, the transit time period 403 begins. The transit time represents the time it takes for the aqueous solution to be absorbed by the front layers of the emulsion prior to reaching the rear layer as seen by the back of the film. Once the liquid reaches the rear of the film, expansion of the film begins at time 407. The emulsion will continue to expand until it has reached its terminal thickness 405 at time 408. At time 408, the emulsion is saturated and will no longer expand.

As illustrated by the graph, the emulsion thickness will vary depending on the pH of the applied emulsion-expanding solution. Upon application of an alkaline pH solution at time 402, the expansion of the emulsion begins until it reaches its terminal thickness 406 at time 408. According to the present invention, it is after time 408 when the terminal thickness of the emulsion has been reached, but before development has begun, that the prescan of the substrate is optimum for minimizing or eliminating coherent speckle.

One suitable solution for expanding the emulsion is a developer which contains no developing agent. Staple types of developers include HC-110 manufactured by Eastman Kodak of Rochester, N.Y. diluted to a 1:7 ratio. Alternatively, the emulsion-expanding solution could be an activating agent which enables the developing agent to work by elevating the pH of the solution to alkalinity. Typical alkaline activators dissolved in aqueous carriers include but are not limited to sodium sulfite and sodium carbonate.

Figure 5:
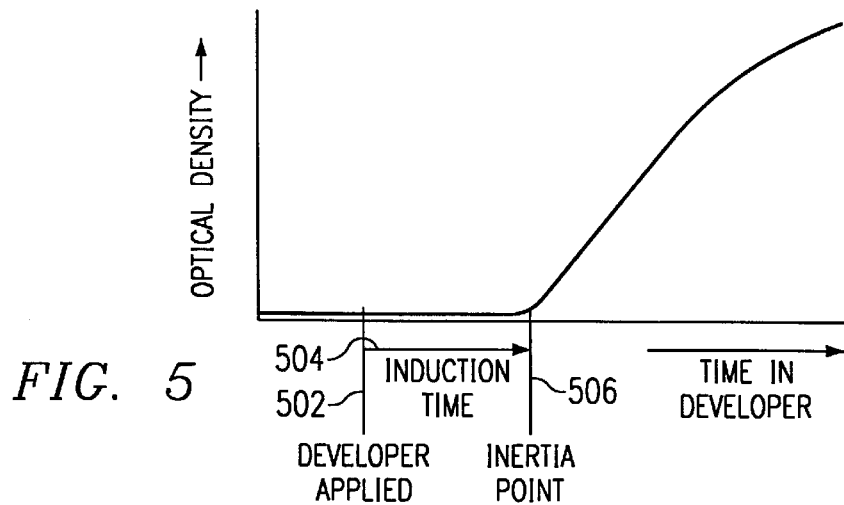
FIG. 5 is a graph representing the relationship of application of developer and emulsion development over time.

In another embodiment of the invention, a developer containing a developing agent is applied to the film emulsion. The developing agent reduces silver halide crystals containing latent image centers. Suitable developing agents include but are not limited to Elon, phenidone, and hydroquinone dissolved in an aqueous carrier and are commonly manufactured by Eastman Kodak, Agfa, and others. In this case, the prescan must be done upon the emulsion reaching its final expansion but before the beginning of substantial development. FIG. 5 represents the time relationship between application of the developer and development of the emulsion. Upon developer application at time 502, there is a specific time period, called the induction time 504, before development of the film begins at inertia point 506. As the induction time proceeds, the optical density of the emulsion increases. There may be a time during which the emulsion expansion and film development phases overlap. In this embodiment, the prescan is optimally performed before the end of the induction time 504 but after the emulsion has substantially expanded. A prescan taken at this point represents the final coherency speckle pattern devoid of unwanted reduced silver halide grains.

If the solution applied to the emulsion is a developer with a developing agent, development begins immediately after the inertia point of the developing agent is reached. If the solution applied to the emulsion did not contain a developing agent, then there is an arbitrarily long time after the film has expanded during which the scan may be made. Once the developing agent is added to the solution on the film, the induction time 504 begins to run. After development has begun, a plurality of scans are performed at spaced time intervals. These scans are then combined into a single post-development scan as is already known in the electronic film development art. The present invention takes the post-development scan containing image and speckle information and differences it pixel by pixel from the prescan information which contains the speckle pattern without the image. During the differencing procedure, a first image and a second image are received in a computer as pixels. Each pixel has a numerical value representing a characteristic, such as luminance, of the substrate corresponding to that pixel. The corresponding pixel information in the first image and second image are combined to create pixel values which will generate a third image in which the speckle pattern has been decreased or entirely eliminated. The combining function may consist of any of a number of mathematical steps or combination of steps including, but not limited to, dividing and subtracting. As a result of combining the first and second images in the present invention, the speckle pattern will be nulled out or significantly reduced.

In general two-component film development, a non-alkaline solution comprising a developing agent is typically applied first, then an alkaline activator is applied subsequently. However, there are situations in which a better result may be obtained if the order in which the agents are applied is reversed or if both developer and activator agents are applied in a single solution that comprises both developer agents and activator agents. The combined solution approach is more common in the art of film development.

While this invention has been described with an emphasis upon certain preferred embodiments, variations in the preferred composition and method may be used and the embodiments may be practiced otherwise than as specifically described herein. Accordingly, the invention as defined by the following claims includes all modifications encompassed within the spirit and scope thereof.

What is claimed is:

1. An electronic film processing system capable of processing a film image, wherein the film image has at least one emulsion layer having at least one noise effect, comprising:

an applicator capable of applying at least one solution to the film image;

at least one scanner capable of scanning the film image to form a first scan image and at least one second scan image; and a computer capable of combining the first scan image with the at least one second scan image to form a digital image with the at least one noise effect decreased.

2. The system of claim 1 wherein the at least one solution is capable of initiating expansion of the emulsion layer.

3. The system of claim 1 wherein the at least one solution comprises a developing agent.

4. The system of claim 1 wherein the at least one solution has an alkaline pH.

5. The system of claim 1 wherein the first scan image is a scan of the film image in an expanded, undeveloped condition.

6. The system of claim 1 wherein each second scan image is a scan of the film image in an expanded, at least partially developed condition.

7. The system of claim 1 wherein each scanner comprises a CCD-array image detector.

8. The system of claim 1 wherein each scanner comprises a light source capable of projecting linear light beam of uniform, diffuse illumination.

9. A film scanning station apparatus for forming at least one digital image from a film image, wherein the film image has at least one emulsion layer with at least one noise effect in the at least one emulsion layer, the apparatus comprising:

at least one bath filled with at least one solution;

a first scanner capable of scanning the film image to form a first scan image;

at least one second scanner capable of scanning the film image to form at least one second scan image;

a transporter capable of moving the film image through each bath and each scanner;

a computer capable of receiving pixel values from the first scan image and the at least one second scan image and capable of combining the pixel values to form a digital image with at least one noise effect decreased.

10. The apparatus of claim 9 wherein the at least one bath has a solution that comprises an expanding agent.

11. The apparatus of claim 9 wherein the at least one bath has a solution that comprises a developing agent.

12. The apparatus of claim 9 wherein the at least one solution has an alkaline pH level.

13. The apparatus of claim 9 wherein the first scan image is a scan of the film image in an expanded, undeveloped condition.

14. The apparatus of claim 9 wherein each second scan image is a scan of the film image in an expanded, at least partially developed condition.

15. The apparatus of claim 9 wherein at least one of the at least one second scan image is a scan of the film image in an expanded, fully developed condition.

16. The apparatus of claim 9 wherein each scanner comprises a CCD-array image detector.

17. The apparatus of claim 9 wherein each scanner comprises a light source capable of projecting linear light beam of uniform, diffuse illumination.

* * * * *